UNITED STATES PATENT OFFICE.

EDWARD L. ANDERSON, OF PITTSBURGH, PENNSYLVANIA, ASSIGNOR TO JOHN S. SNYDER, OF PITTSBURGH, PENNSYLVANIA.

METHOD OF PRODUCING CERTAIN COMMERCIAL PRODUCTS FROM POTASH FELDSPAR.

1,174,795.   Specification of Letters Patent.   Patented Mar. 7, 1916.

No Drawing.   Application filed November 10, 1915.   Serial No. 60,719.

*To all whom it may concern:*

Be it known that I, EDWARD L. ANDERSON, a citizen of the United States, and resident of Pittsburgh, in the county of Allegheny and State of Pennsylvania, have invented certain new and useful Improvements in Methods of Producing Certain Commercial Products from Potash Feldspar, of which the following is a specification.

The method of the present invention, while relating to the decomposition of insoluble alkaline minerals in general, has particular reference to the decomposition of feldspar, and its practice in that connection is described herein.

While it has been known that silicates can be decomposed with a treatment of hydrofluoric acid followed by sulfuric acid, or with a mixture of those acids, the procedures heretofore suggested have involved the use of hydrofluoric acid in such large quantity as to render the operation commercially impractical.

Under the conditions of temperature and atmospheric pressure heretofore proposed, if a small amount of hydrofluoric acid is used in a mixture with sulfuric acid of sufficient dilution with water to keep all the sulfates in solution, the hydrofluoric acid does not act to its fullest extent for the reason that the silicon tetrafluorid combines with the water to form silicic acid and hydrofluosilicic acid, the latter accumulating in the solution in the presence of the amount of water required to keep the sulfates in solution. This removes the hydrofluoric acid from the sphere of action. With the reaction proceeding at atmosphereic pressure the working temperature could not exceed the boiling point of the mixture and would likely be somewhat lower. If the reaction is carried out at higher temperatures, the hydrofluosilicic acid decomposes and forms hydrofluoric acid and silicon tetrafluorid, both of which are gases and would tend to escape from the solution.

What is required in order to utilize the hydrofluoric acid to the fullest extent is a set of conditions that will permit of the continuous decomposition of hydrofluosilicic acid into hydrofluoric acid and silicon tetrafluorid which are not allowed to escape, the silicon tetrafluorid being decomposed by the water to form silicic acid and hydrofluosilicic acid, the latter undergoing the above decomposition again, and all the hydrofluoric acid being retained to react with the silicate.

I have found as a result of a long series of investigations that I am able to carry out the decomposition of feldspar efficiently and economically with relatively small amounts of hydrofluoric acid in the presence of sulfuric acid of sufficient dilution to keep in solution all the sulfates that form. This I accomplish in the following manner: Finely ground feldspar, preferably of about 150 mesh, is mixed with an equal amount in weight of water in an acid-proof vessel provided with cover and means for heating same to a temperature of say from 275° F. to 350° F. for maintaining a pressure of 50 to 75 pounds per square inch. To this mixture is added an equivalent amount of sulfuric acid necessary to combine and form sulfates with the aluminum and potassium contained in the feldspar. In addition there is added to this mixture an amount of hydrofluoric acid equal to approximately five per cent. (5%) of the amount of sulfuric acid used or the chemical equivalent of fluorspar. In practice, I have found that the percentage of hydrofluoric acid may be varied between 2 and 10 per cent., the difference being that in using a lower percentage the operation requires a longer time for a complete reaction. With the conditions above recited, complete reaction may be had in from eight to ten hours.

I have discovered that in order to accomplish complete decomposition of the feldspar with complete absorption of all acid, the strength of the acid must be maintained. As the available amount of sulfuric acid decreases as the reaction proceeds, I maintain the requisite strength by reducing the water content of the acid mixture, accomplishing this by liberating steam therefrom. I find that if I liberate steam at the beginning of the process, a small amount of hydrofluoric acid as well as silicon tetrafluorid escapes, but if no steam is liberated until after the reaction has continued for about two hours, there will be no escape of hydrofluoric acid or silicon tetrafluorid gases. This condition is due to the fact that all the fluorin has had time to combine with the bases to form fluorids, and under the maintained pressure at which the steam is released the hydrofluoric acid and silicon tetrafluorid are so combined with or held by the water and the bases that they cannot escape.

Under the most favorable operating conditions the complete reaction may be carried out by using the theoretical amounts of feldspar and sulfuric acid. However, I have demonstrated that under conditions of operation usually encountered the reaction may be more speedily accomplished by using an excess of feldspar. By so doing, the rapidity of the reaction is maintained until most of the sulfuric acid has been converted into sulfates of the metals, the remaining undecomposed feldspar being readily separable from the silica residue and hence available for subsequent decomposition.

During this operation the following reactions take place: The hydrofluoric acid acting on the feldspar forms silicon tetrafluorid, aluminum fluorid, potassium fluorid, and water. The silicon fluorid combines with the water present to form hydrofluosilicic acid and silicic acid. The hydrofluosilicic acid in the presence of water and at the temperature and pressure existing reacts to form silicon tetrafluorid and hydrofluoric acid. The silicon tetrafluorid so formed is, in turn, converted into hydrofluoric acid and hydrofluosilicic acid, the latter again reacting as above. The aluminum fluorids and potassium fluorids are decomposed by the sulfuric acid and form aluminum sulfate, potassium sulfate, and hydrofluoric acid. The silicic acid in the presence of water and sulfuric acid is dehydrated, forming silicon dioxid.

The reactions involved are expressed in the following equations:

$$K_2O Al_2O_3 6SiO_2 + 32HF = 6SiF_4 + 2AlF_3 + 2KF + 16H_2O.$$

$$2AlF_3 + 3H_2SO_4 = Al_2(SO_4)_3 + 6HF.$$

$$2KF + H_2SO_4 = K_2SO_4 + 2HF.$$

$$3SiF_4 + 4H_2O = 2H_2SiF_6 + H_4SiO_4.$$

$$H_2SiF_6 = SiF_4 + 2HF.$$

$$H_4SiO_4 = 2H_2O + SiO_2.$$

The mixture after the action has finished may be filtered in suitable apparatus for the separation of the liquid from the residue. The insoluble residue consists of pure silica, while the solution contains the sulfates of aluminum and potash, together with a small amount of hydrofluoric and sulfuric acids. This solution may now be neutralized by calcium hydroxid or other suitable agent during which operation the iron salts are precipitated, previously oxidizing the iron salts if necessary. From this point the procedure will depend on the products it is desired to obtain. For example, potash alum may be obtained by evaporating the solution of the sulfates of potassium and aluminum until crystallization sets in. If it is desired to separate the potassium sulfate from the alumina, the dried mixture containing the potassium and aluminum sulfates may be calcined at a temperature sufficient to decompose the aluminum sulfate only, forming alumina, and leaving the potassium sulfate undecomposed. From this mixture the potassium sulfate may be separated by simple leaching, followed by concentration by evaporation to the crystallizing point, giving as products potassium sulfate and alumina.

The method of the present invention enables me to produce valuable compounds from insoluble alkaline minerals, and particularly potash feldspar, in commercially economical quantities heretofore impossible.

I claim:

1. The process of treating feldspar or the like, consisting in subjecting feldspar to the action of a solution containing a decomposing agent together with a reagent for combining with the bases, and maintaining the mixture under pressure and at a temperature above its normal boiling point.

2. The process of treating feldspar or the like, consisting in subjecting feldspar to the action of a solution containing a decomposing agent together with a reagent for combining with the bases, the decomposing agent being less than the theoretical amount necessary to combine with all the bases, and maintaining the mixture under pressure and at a temperature above its normal boiling point.

3. The process of treating feldspar or the like, consisting in subjecting feldspar to the action of a solution containing a decomposing agent together with a reagent for combining with the bases, and decreasing the water content of the acid solution as the decomposition proceeds.

4. The process of treating feldspar or the like, consisting in subjecting such mineral to the action of a solution containing a decomposing agent together with a reagent for combining with the bases, maintaining the mixture under pressure and at a temperature above its normal boiling point, and decreasing the water content of the acid solution as the decomposition proceeds.

5. The process of treating feldspar or the like, consisting in subjecting feldspar to the action of a decomposing solution containing hydrofluoric acid and a reagent that will combine with the bases, and maintaining the mixture under pressure and at a temperature above its normal boiling point.

6. The process of treating feldspar or the like, consisting in subjecting feldspar to the action of a solution containing a decomposing agent together with sulfuric acid for combining with the bases, and maintaining the mixture under pressure and at a temperature above its normal boiling point.

7. The process of treating feldspar or the like, consisting in subjecting feldspar to the action of a decomposing solution containing hydrofluoric acid together with sulfuric acid for combining with the bases, and maintaining the mixture under pressure and at a temperature above its normal boiling point.

8. The process of treating feldspar or the like, consisting in subjecting feldspar to the action of a solution containing a decomposing agent together with a reagent for combining with the bases, the amount of feldspar subjected to said solution being in excess of the theoretical amount which the solution will decompose, and maintaining the mixture under pressure and at a temperature above its normal boiling point.

9. The process of treating feldspar or the like, consisting in subjecting feldspar to the action of a solution containing a decomposing agent together with a reagent for combining with the bases, the amount of feldspar subjected to said solution being in excess of the theoretical amount which the solution will decompose, maintaining the mixture under pressure and at a temperature above its normal boiling point, and decreasing the water content of the acid solution as the decomposition proceeds.

10. The process of treating feldspar or the like, consisting in subjecting feldspar to the action of a solution containing a decomposing agent together with a reagent for combining with the bases, maintaining the mixture under pressure and at a temperature above its normal boiling point, and neutralizing the mixture to precipitate the iron salts.

In testimony whereof I affix my signature in presence of two witnesses.

EDWARD L. ANDERSON.

Witnesses:
J. M. NESBIT,
JOHN S. SNYDER.